No. 868,022. PATENTED OCT. 15, 1907.
O. H. SHAFER.
SAFETY VALVE FOR WATER JACKETS.
APPLICATION FILED MAR. 13, 1907.

WITNESSES:

INVENTOR
Oren H. Shafer.
BY
Herbert W. Jenner.
Attorney

UNITED STATES PATENT OFFICE.

OREN H. SHAFER, OF PETOSKY, MICHIGAN.

SAFETY-VALVE FOR WATER-JACKETS.

No. 868,022.  Specification of Letters Patent.  Patented Oct. 15, 1907.

Application filed March 13, 1907. Serial No. 362,120.

*To all whom it may concern:*

Be it known that I, OREN H. SHAFER, a citizen of the United States, residing at Petosky, in the county of Emmet and State of Michigan, have invented certain new and useful Improvements in Safety-Valves for Water-Jackets; and I do hereby declare the following to be a full, clear, and exact description of the invention, such as will enable others skilled in the art to which it appertains to make and use the same.

This invention relates to safety valves for use in connection with the water jackets of gas and other similar engines, to prevent the said jackets from bursting in cold weather; and it consists in the novel construction and combination of the parts hereinafter fully described and claimed.

Figure 1:
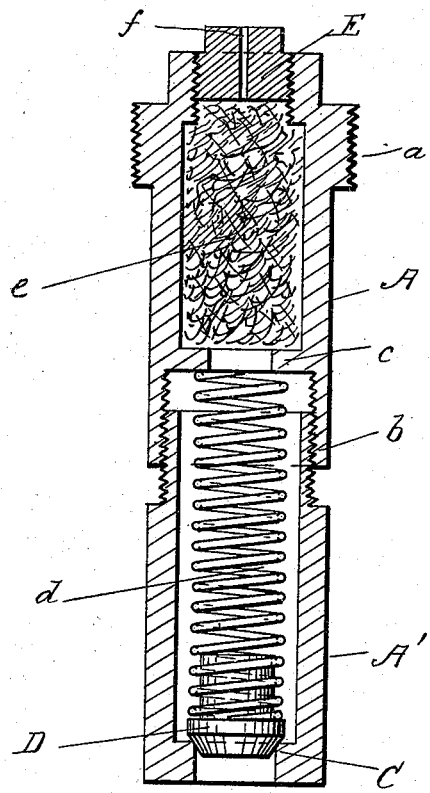
Figure 2:
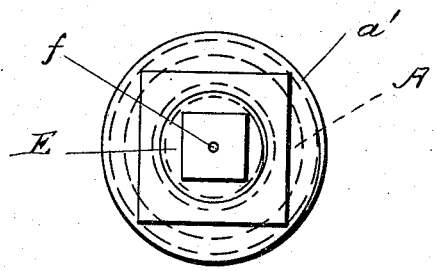

In the drawings, Figure 1 is a longitudinal section through the safety valve. Fig. 2 is an end view of the same.

A is a tube having a screwthreaded portion $a'$ at one end for engaging with a screwthreaded hole in the water jacket of the engine. The tube is preferably formed of two sections which are connected together by a screwthreaded portion $b$. The end section $A'$ is provided with a valve seat C, and the other section is provided with a projecting ring or shoulder $c$.

D is a valve which is pressed against the seat C by a spring $d$ arranged between the back of the valve and the shoulder $c$. The tube is made in two sections in order that the said valve and spring may be placed within it, and in order that the requisite pressure may be given to the valve by screwing the tube sections together. The outer tube section is provided with a plug E, and $e$ is a packing of asbestos inserted in the outer tube section between the plug E and the shoulder $c$. The plug $e$ has a small hole $f$ for the escape of air or water. The tube is secured within the water jacket of the engine, and when the water freezes and expands, the valve is forced backward from its seat. The tube is made of considerable length so that the valve may be in contact with the water which is the last to become frozen.

What I claim is:

In a relief-valve for a water-jacket, the combination, with a tube formed of two sections, the inner section of the said tube having a valve seat at its inner end, and the outer section of the said tube having a fastening device at its outer end for securing it to a water-jacket and having also an inwardly projecting ring at its inner end portion, a chamber for asbestos fiber being formed between the said ring and the outer end of the said tube; of a perforated plug closing the said chamber, a valve normally bearing on the said valve-seat, and a spring arranged between the said ring and valve.

In testimony whereof I have affixed my signature in the presence of two witnesses.

OREN H. SHAFER.

Witnesses:
 G. B. LOWE,
 F. S. LYON.